United States Patent [19]

Rogers et al.

[11] Patent Number: 5,052,933
[45] Date of Patent: Oct. 1, 1991

[54] FIRE FIGHTER TRAINER

[75] Inventors: William Rogers, Hopatcong; James J. Ernst, Livingston; Steven Williamson, Haledon; Dominick J. Musto, Middlesex, all of N.J.

[73] Assignee: Symtron Systems, Inc., Fair Lawn, N.J.

[21] Appl. No.: 605,527

[22] Filed: Oct. 29, 1990

[51] Int. Cl.$^5$ .................................................. G09B 9/00
[52] U.S. Cl. ...................................................... 434/226
[58] Field of Search .................................. 434/219, 226

[56] References Cited

U.S. PATENT DOCUMENTS

| | | | |
|---|---|---|---|
| 3,675,342 | 7/1972 | Wolff | 434/226 |
| 3,675,343 | 7/1972 | Swiatosz et al. | 434/226 |
| 4,001,949 | 1/1977 | Francis | 434/226 |
| 4,861,270 | 8/1989 | Ernst et al. | 434/226 |

Primary Examiner—Richard J. Apley
Assistant Examiner—Glenn E. Richman
Attorney, Agent, or Firm—Richard T. Laughlin

[57] ABSTRACT

A fire fighter trainer device and method for use in training fire fighters in the extinguishment of a simulated crashed-air craft fuel-spill fire. The trainer includes a pit structure, a fuel distribution system, a burner control system connected to a computerized operator control panel, and an extinguishing agent detection system connected to the operator control panel.

8 Claims, 1 Drawing Sheet

FIRE FIGHTER TRAINER

The invention relates to a live flame fire trainer and method, and in particular to a crashed-aircraft spilled-fuel fire fighter trainer having a centrally controlled burner system and fire spread system.

BACKGROUND OF THE INVENTION

The prior art fire fighter trainer includes a burner area having a pit structure holding liquid aviation jet fuel or other liquid fuel, dumping means for supplying fuel to the pit structure, and a simulated aircraft mockup structure disposed in or near to the pit structure.

One problem with the prior art trainer is the air pollution caused by the burning aviation jet fuel. A second problem is ground pollution caused by the runoff of extinguishing agents and of unburned fuel. A third problem is the difficulty of grading the performance of the fire fighter trainees. In addition, the prior art trainer can not be rapidly shut down if an actual emergency situation occurs during training.

SUMMARY OF THE INVENTION

According to the present invention, a fire fighter trainer is provided. This trainer comprises a pit structure, a burn area disposed in the burn area, a liquid or vapor propane distribution system, a burner control system, a central operator control panel which can utilize a computer or can be manually operated and an extinguishing agent detection system.

By using the cleaning burning propane in place of the jet fuel the problem of air pollution and the problem of ground pollution from fuel are minimized. By using the central operator control panel the flow of propane liquid or vapor to the various areas of the pit structure can be controlled to produce a flame pattern that is consistent in growth, spread, and response to application of extinguishing agents, with an actual jet fuel spill fire. The central operator control panel permits the evaluation of the trainees' performance by monitoring the trainees' extinguishment efforts. Additionally, the flow of propane liquid or vapor to the pit structure can be shut down, stopping the fire, and the training exercise, in the event of an emergency. The central operator control panel can respond to the application of surrogate extinguishing agents, such as biodegradable foams and powders, and cause the fire to respond as if real extinguishing agents were applied, thereby permitting the use of such surrogates that produce far less pollutants than actual extinguishing agents.

The foregoing and other objects, features and advantages will be apparent from the following description of the preferred embodiment of the invention as illustrated in the accompanying drawings.

DESCRIPTION OF THE PREFERRED EMBODIMENT

Figure 1:
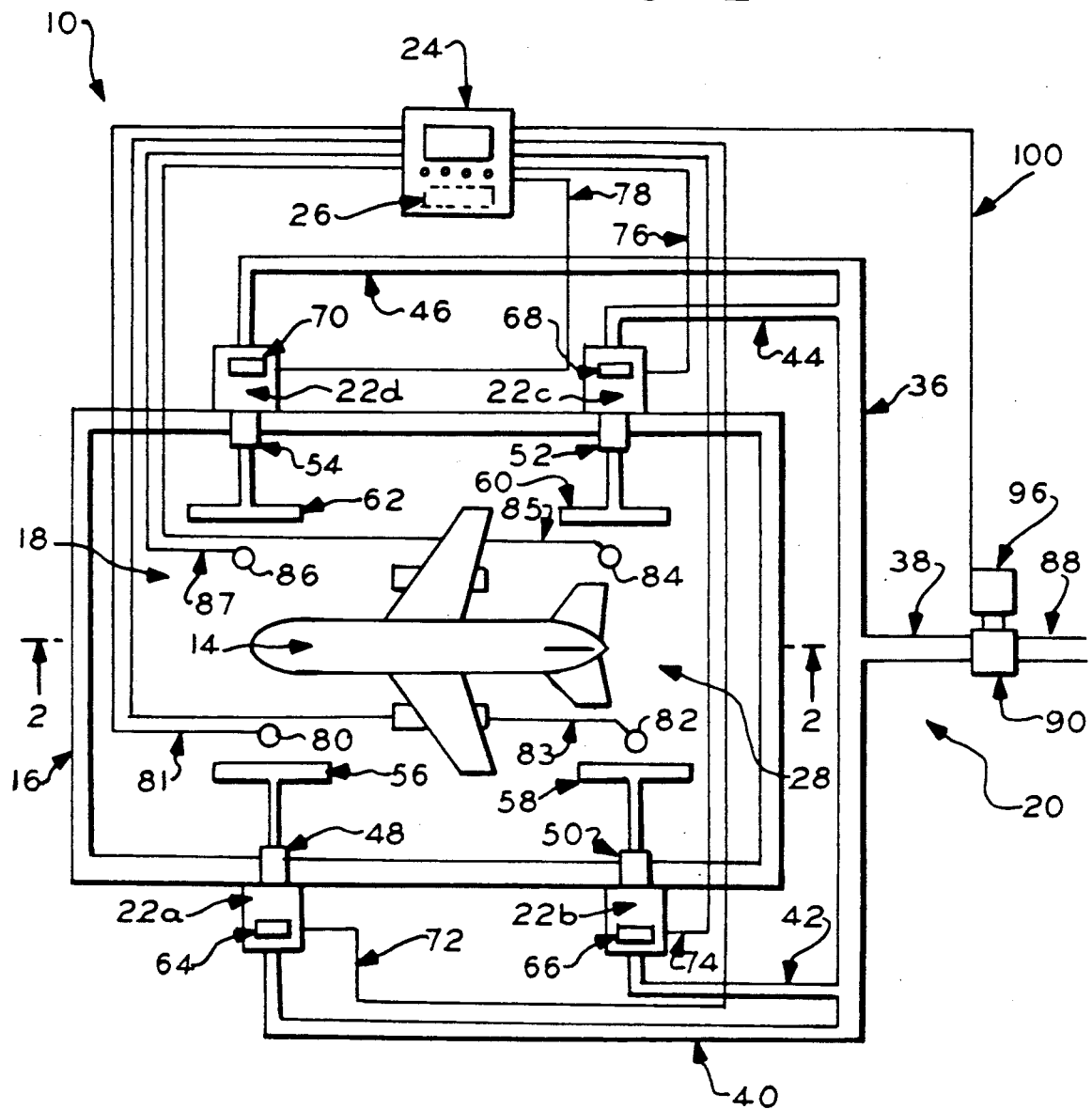
FIG. 1 is a plan section view as taken along line 1—1 of FIG. 2.
Figure 2:
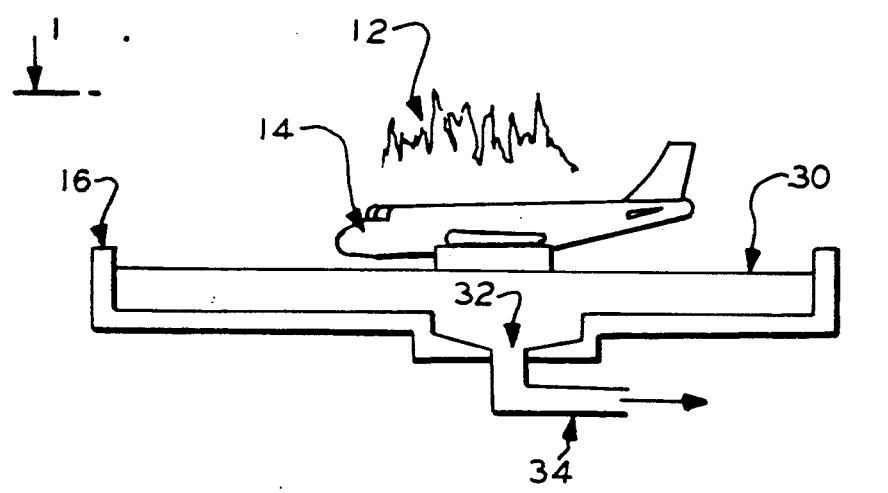
FIG. 2 is a vertical section view as taken along line 2—2 of FIG. 1.

As shown in FIGS. 1 and 2, a fire fighter trainer 10 is provided. Trainer 10 is used to train fire fighters to extinguish a simulated fuel spill fire 12 of a simulated aircraft or mockup 14. Trainer 10 includes a burn area 18 which is disposed in a pit structure 16. Trainer 10 has a fuel distribution system 20, and a burner control system 22 comprising burner controls 22a, 22b, 22c, and 22d. Trainer 10 also includes a central operator panel 24, which has a computer 26 connected thereto, and together 24 and 26 form the central control system. Trainer 10 also has an extinguishing agent detection system, which detects the application of extinguishing agents, or surrogate extinguishing agents.

Pit structure 16 contains the burn area 18, and may be round, oval, rectangular, or other shape as required for the particular training intent. Pit structure 16 can be made of poured or precast concrete, or metal, or other suitable material to contain the fire. Burn surface 30 is an appropriate material to provide for an area of combustion of propane fuel, and provide a realistic appearance for training. Pit structure 16 has a drainage system 32, which connects to a drain pipe 34, to collect and dispose of extinguishing agents applied to the fire.

Fuel distribution system 20 has a liquid or vapor propane manifold 36, which has an inlet pipe 38. Manifold 36 has a distribution pipes 40, 42, 44 and 46 in this embodiment for the supply of liquid or vapor propane to segments of the burn area. The total number of distribution pipes, burners, and pilots will depend on the size of the burn area, and may be many more than illustrated in this embodiment. Pipes 40, 42, 44, 46 respectively have burners 48, 50, 52, and 54.

Burners 48, 50, 52 and 54 have respective flame distribution elements 56, 58, 60 and 62. Typical pilot for each burner provides the ignition source for the propane liquid or vapor that burns from the respective flame distribution element to produce the training fire flame.

Burner controls 22a, 22b, 22c, and 22d contain respective motorized control valve 64, 66, 68 and 70, and are connected by respective electrical conduits 72, 74, 76, and 78 to the central operator control panel 24.

Agent detection system 28 has detectors 80, 82, 84, and 86. Detectors 80, 82, 84, 86 have respective electrical conduits 81, 83, 85, 87. Detectors 80, 82, 84, 86 each detect extinguishing agents or surrogate extinguishing agents applied to the fire. Conduits 81, 83, 85, 87 each connects to the operator panel 24.

Control panel 24 is operated by an instructor. Control panel 24 controls liquid or vapor propane flow volume and distribution, by opening and closing motorized control valves 64, 66, 68 and 70 according to a scenario of fire growth and spread. Control panel 24 displays safety related data to the instructor, and has an automatic emergency shutdown subsystem for emergency conditions.

Inlet pipe 38 has a liquid or vapor propane supply pipe 88, which has a shutoff valve 90. Valve 90 which is motorized, has control 96 which has electrical conduit 100 that is connected to control panel 24. Valve 90 is a safety shut off valve which will close automatically on loss of electrical power to the trainer, thereby stopping all propane flow.

The method of training fire fighters includes the steps of: forming a trainer 10 including a pit structure 16, a propane distribution system 20, burner control system 22 connected to propane distribution system 20, an operator control panel 24 connected to the burner control system 22, a computer 26 connected to the control panel 24, and an extinguishing agent detector system 28 connected to the control panel 24; initiating the operation of control panel 24; preparing operating parameters and a scenario having a fire growth rate and fire spread rate and difficulty of extinguishment including using prior data from computer. 26; confirming ignition of pilot flames in pilots 48, 50, 52 and 54; sequentially opening fuel valves 64, 66, 68, 70 according to the fire scenario; directing fire fighters in extinguishing fire; adjusting control of fuel valves 64, 66, 68, 70; extinguishing fire by closing fuel valves 64, 66, 68 and 70; and closing valve 90 at final shutdown.

The advantages of trainer 10 are indicated hereafter.

A) Air and ground water pollution is minimized by using propane instead of jet fuel.

B) Extinguishment of the fire is facilitated by shutting off each valve 64, 66, 68 and 70 after the appropriate agent detector signals application of agents.

C) Computer 26 can record data and directly monitor each of the systems 20, 22, 28, during the fire, and continuously display the data, and furnish a final performance printout.

D) Training exercises can be run in series without a cleanup after any exercise.

E) Training scenarios can be prepared and adjusted for each of the exercises by the instructor.

F) Emergency shutdown by the instructor at control panel 24, and automatic emergency shutdown by control panel 24 and computer 26, are provided.

G) Ground water pollution is further minimized by collecting extinguishing agents using drain 32, drain pipe 34 and a pollution tank.

While the invention has been described in its preferred embodiment, it is to be understood that the words which have been used are words of description rather than limitation and that changes may be made within the purview of the appended claims without departing from the true scope and spirit of the invention in its broader aspects.

For example, a liquid propane burner, as described in copending U.S. application Ser. No. 387,348, filed Aug. 9, 1989, entitled "Fire Fighter Trainer" by Ernst et al, can be used, in place of each burner herein.

What is claimed is:

1. A fire fighter trainer comprising:
   a burn area disposed in a pit structure for holding a simulated crashed aircraft;
   a fuel distribution and burner system for supporting a fire in the pit structure;
   a burner control system connected to the fuel distribution and burner system;
   a central operator control panel connected to the burner control system;
   a computing system connected to the central operator control panel; and
   an agent detecting system to automatically control flame response to an extinguishment agent application.

2. The trainer of claim 1, wherein the fuel distribution and burner system includes:
   a manifold;
   a plurality of selectively positioned burners disposed in the pit structure; and
   each burner has a pipe connected to the manifold and has a pilot line with a connection to its pipe.

3. The trainer of claim 2, wherein the control system includes:
   a plurality of motorized valves connected respectively to the burners; and
   each motorized valve has an electrical conduit connected to the central operator control panel.

4. The trainer of claim 3 wherein the agent detection system includes a plurality of detectors disposed respectively adjacent to the respective flame distribution elements.

5. The trainer of claim 2, wherein the manifold includes:
   a propane supply pipe connected thereto; and
   a motorized valve connected in the propane supply pipe and having an electrical conduit connected to the central operator control for using propane fuel for the fire.

6. A method of training fire fighters, including the steps of:
   forming a trainer including a burn area disposed in a pit structure for holding a simulated crashed aircraft and including a full distribution system and burner system and pilot system and including a burner control valve system connected to the burner system and including a central operator control panel connected to the burner control valve system and including a computer connected to the central operator board and including a fire detection system connected to the board;
   initiating operation of the central operator control panel;
   preparing operating parameters and a training scenario having a fire growth rate and a fire spread rate and an extinguishment difficulty level;
   sequentially opening valves in the burner control valve system; and
   directing fire fighters in the extinguishment of the fire.

7. The method of claim 6, including the steps of:
   extinguishing the fire by closing the valves in the burner system sequentially in a pattern that matches the pattern of extinguishing agent application.

8. The method of claim 6, including the steps of:
   forming a manifold having separate pipes supplying burners of the burner system for distributing the fuel from the manifold; and
   forming a liquid propane supply line connected to the manifold and having a motorized valve with a conduit to the operator control panel.

* * * * *